(12) United States Patent
Bulgajewski

(10) Patent No.: US 7,202,444 B2
(45) Date of Patent: *Apr. 10, 2007

(54) FLEXIBLE SEAT HEATER

(75) Inventor: Edward F. Bulgajewski, Genoa, IL (US)

(73) Assignee: Illinois Tool Works Inc., Glenview, IL (US)

( * ) Notice: Subject to any disclaimer, the term of this patent is extended or adjusted under 35 U.S.C. 154(b) by 420 days.

This patent is subject to a terminal disclaimer.

(21) Appl. No.: 10/883,377

(22) Filed: Jul. 1, 2004

(65) Prior Publication Data

US 2004/0238516 A1 Dec. 2, 2004

Related U.S. Application Data

(63) Continuation-in-part of application No. 10/243,578, filed on Sep. 13, 2002, now Pat. No. 6,884,965, which is a continuation-in-part of application No. 09/889,843, filed as application No. PCT/US00/01702 on Jan. 24, 2000, now Pat. No. 7,053,344.

(60) Provisional application No. 60/117,144, filed on Jan. 25, 1999.

(51) Int. Cl.
H05B 1/00 (2006.01)

(52) U.S. Cl. ............... 219/217; 219/212; 219/528; 219/529; 219/543; 219/549

(58) Field of Classification Search ............... 219/217, 219/203, 211, 212, 219, 528, 529, 543, 549; 338/306–309
See application file for complete search history.

(56) References Cited

U.S. PATENT DOCUMENTS

| | | | |
|---|---|---|---|
| 3,877,788 A | 4/1975 | Sprague et al. ............ 356/124 |
| 4,032,752 A | 6/1977 | Ohmura et al. ............ 219/541 |
| 4,399,347 A | 8/1983 | Schmitt .................... 219/203 |
| 4,436,986 A | 3/1984 | Carlson .................... 219/505 |
| 4,665,304 A | 5/1987 | Spencer .................... 219/219 |
| 4,713,531 A | 12/1987 | Fennekels et al. ......... 219/545 |
| 4,719,335 A | 1/1988 | Batliwalla et al. |
| 4,761,541 A | 8/1988 | Batliwalla et al. ......... 219/528 |
| 4,845,343 A | 7/1989 | Aune et al. ................ 219/565 |
| 4,857,711 A | 8/1989 | Watts ...................... 219/548 |
| 4,868,898 A | 9/1989 | Seto ........................ 219/528 |
| 5,034,594 A | 7/1991 | Beezhold et al. .......... 219/528 |
| 5,081,339 A | 1/1992 | Stine ....................... 219/217 |
| 5,111,025 A | 5/1992 | Barma et al. ............. 219/217 |
| 5,197,595 A | 3/1993 | Coultas .................... 206/0.6 |
| 5,206,482 A | 4/1993 | Smuckler .................. 219/219 |

(Continued)

FOREIGN PATENT DOCUMENTS

EP 0 202 896 A 11/1986

(Continued)

Primary Examiner—Robin Evans
Assistant Examiner—Vinod Patel
(74) Attorney, Agent, or Firm—Mark W. Croll; Paul F. Donovan

(57) ABSTRACT

A heating device includes a conductive layer on an electrically insulated substrate. The substrate and conductive layer have a plurality of cross-like apertures therethrough. The conductive layer includes busses and traces extending from the busses, the traces surrounding the apertures. A resistive or thermistor layer is provided over the conductive layer.

20 Claims, 6 Drawing Sheets

U.S. PATENT DOCUMENTS

| | | | |
|---|---|---|---|
| 5,405,178 A | 4/1995 | Weingartner et al. | 297/211 |
| 5,422,462 A | 6/1995 | Kishimoto | 219/545 |
| 5,451,747 A | 9/1995 | Sullivan et al. | 219/528 |
| 5,643,480 A | 7/1997 | Gustavsson et al. | 219/211 |
| 5,679,277 A | 10/1997 | Niibe et al. | 219/543 |
| 5,801,914 A | 9/1998 | Thrash | 361/104 |
| 5,824,996 A | 10/1998 | Kochman et al. | 219/529 |
| 5,851,588 A | 12/1998 | Uthoff, Jr. | 427/228 |
| 5,861,610 A | 1/1999 | Weiss | 219/497 |
| 5,961,869 A | 10/1999 | Irgens | 219/549 |
| 6,031,214 A | 2/2000 | Bost et al. | 219/545 |
| 6,054,690 A | 4/2000 | Petit et al. | 219/528 |
| 6,084,217 A | 7/2000 | Bulgajewski | 219/505 |
| 6,093,910 A | 7/2000 | McClintock et al. | 219/217 |
| 6,097,009 A | 8/2000 | Cole | 219/528 |
| 6,111,234 A | 8/2000 | Batliwalla et al. | 219/549 |
| 6,124,577 A | 9/2000 | Fristedt | 219/497 |
| 6,143,206 A | 11/2000 | Handa et al. | 252/500 |
| 6,150,642 A | 11/2000 | Weiss et al. | 219/528 |
| 6,172,344 B1 | 1/2001 | Gordon et al. | 219/529 |
| 6,189,487 B1 | 2/2001 | Owen et al. | 119/28.5 |
| 6,194,687 B1 | 2/2001 | Joseph et al. | 219/217 |
| 6,215,111 B1 | 4/2001 | Rock et al. | 219/545 |
| 6,220,659 B1 | 4/2001 | McDowell et al. | 297/180.12 |
| 6,229,123 B1 | 5/2001 | Kochman et al. | 219/549 |
| 6,307,188 B1 | 10/2001 | Bulgajewski | 219/505 |
| 6,353,207 B1 | 3/2002 | Burt | 219/217 |
| 6,426,485 B1 | 7/2002 | Bulgajewski et al. | 219/219 |
| 6,455,823 B1 | 9/2002 | Bulgajewski et al. | 219/548 |
| 6,495,809 B2 | 12/2002 | Bulgajewski et al. | 219/548 |
| 6,559,422 B2 | 5/2003 | Burt | 219/217 |
| 6,857,697 B2 | 2/2005 | Brennan et al. | |
| 6,906,293 B2 | 6/2005 | Schmiz et al. | |
| 2004/0100131 A1 | 5/2004 | Howick et al. | |

FOREIGN PATENT DOCUMENTS

| | | |
|---|---|---|
| JP | 57-134655 | 8/1982 |
| JP | 62-109385 | 7/1987 |
| JP | 11-244093 | 9/1999 |
| JP | 2000-333781 | 12/2000 |
| JP | 2002-50459 | 2/2002 |
| JP | 2004-55219 | 2/2004 |

FLEXIBLE SEAT HEATER

CROSS-REFERENCE TO RELATED APPLICATIONS

This application is a continuation-in-part of U.S. application Ser. No. 10/243,578 filed Sep. 13, 2002 now U.S. Pat. No. 6,884,965, entitled "FLEXIBLE HEATER DEVICE", which is a continuation-in-part of U.S. application Ser. No. 09/889,843 filed Jul. 22, 2002 now U.S. Pat. No. 7,053,344, entitled "SELF-REGULATING FLEXIBLE HEATER", which is a 371 of PCT/US00/01702 filed Jan. 24, 2000, which claims priority from U.S. provisional application Ser. No. 60/117,144, filed on Jan. 25, 1999. The disclosures of these prior applications are incorporated herein by reference.

FIELD OF THE INVENTION

The present invention relates to heating systems suitable for use in automobile components, but which may also be used in other applications. In particular, this invention relates to a heating device with a dielectric substrate having a conductor material and a resistive layer screen printed thereon that is particularly useful for flexible applications, such as heating automobiles seats.

BACKGROUND OF THE INVENTION

Heating devices with temperature regulating properties are used in the automotive industry. Some automotive applications, such as self-regulating heaters for external mirrors, do not require flexibility. Such heaters can be found in U.S. Pat. No. 4,931,627 and U.S. Pat. No. 4,857,711, both commonly owned with the present application.

Self-regulating heaters of the type described are constructed on a polyester substrate that does not allow stretch and has only limited flexibility. These product characteristics allow screen-printed heaters and conductor traces to function properly in many applications. When used in non-flexing applications, such as mirror heaters, stretch and flexibility are not required. However, it is desirable to use self-regulating heaters also in applications requiring flexibility, such as seat heaters in automobiles. In such applications, stiffness is required for durability so that conductor traces comprising the heater do not stretch and do not pull apart. However, this same stiffness can make the seat uncomfortable by limiting the ability of the heater to conform to the user. Further, the stiffness of the polyester base generates a crinkling noise when the heater is flexed. Again, in applications such as automobile seats, noise from crinkling of the heater is objectionable. Further, a seat heater must breathe. Seat coverings are often made of breathable material or material having small pin holes therein. The padding or foam used in the seat is also provided with holes for breathing. Breathing is necessary to wick away moisture from occupants remaining in the seat for long periods of time. Further, some automobile seats are even provided with ventilation systems, including fans and/or air conditioning circuits. Therefore, the heater positioned as a layer near the upper surface of the seat must also breathe to provide proper ventilation and comfort to the occupant.

The parent applications of the present application have provided a flexible heater which has been very satisfactory when flexibility is required, for example, in an automotive application, such as an automotive seat. However, further refinements are desired to allow the material of the heater to better flex without any degradation in performance, particularly regarding heating capacity and uniformity of heating. In particular, it is desirable to provide maximum flexibility together with maximum heater surface area. Similarly, still further refinements are desired in providing improved stress relief, flexibility and ventilation.

SUMMARY OF THE INVENTION

The present invention provides a self-regulating heater, particularly useful for automobile seats having advantageously designed holes therethrough that improve flexibility, reduce noise from crinkling and provide increased surface area for heating uniformity.

In one aspect thereof, the present invention provides a heating device for producing heat when connected to an electrical power source, with an electrically insulative substrate positioned beneath a flexible member and a plurality of apertures through the substrate and the member. At least some of the apertures are narrow elongated apertures. A conductive layer is screen printed on the substrate in a pattern forming a buss structure including first and second busses along opposite sides of the substrate and alternating traces electrically connected to opposite busses and extending between the busses. The traces surround the apertures. A resistive layer is applied to the conductive layer such that when an electrical power source is connected to the buss structure of the heating device, heat is generated.

In another aspect thereof, the present invention provides a heating device for producing heat when connected to an electrical power source, with an electrically insulated substrate having a plurality of cross-like apertures extending therethrough. A conductive layer on the substrate includes busses extending along opposite edges of the substrate and traces extending from the busses and surrounding the apertures. A resistive layer is against the conductive layer such that when an electrical power source is connected to the buss structure of the heating device, heat is generated.

In still another aspect thereof, the present invention provides a heating device for producing heat when connected to an electrical power source, with a substrate and a layer of resistive material. A plurality of cross-like apertures is formed through the substrate and the resistive material. A layer of conductive material forms a first buss along one edge of the substrate and the resistive material, a second buss along an opposite edge of the substrate and the resistive material, a plurality of first traces extending from the first buss toward the second buss and a plurality of second traces extending from the second buss toward the first bus. The first and second traces surrounding at least some of the apertures and are arranged alternatingly with each other.

It is therefore a feature of the present invention to provide a heating device, particularly for seat heating applications for the automotive industry, which provides increased flexibility and fatigue resistance without compromising performance.

It is therefore a further feature of the present invention to provide a heating device, particularly for seat heating applications for the automotive industry, which maintains its capacity and uniformity of heating through the lifetime of the product.

It is therefore a further feature of the present invention to provide a heating device, particularly for seat heating applications for the automotive industry, which maintains its performance after repeated flexing.

It is therefore a still further feature of the present invention to provide a heating device, particularly for seat heating applications for the automotive industry, which provides reduced stresses when flexed or even stretched.

It is therefore a still further feature of the present invention to provide a heating device, particularly for seat heating applications for the automotive industry, which provides improved ventilation.

Other features and advantages of the invention will become apparent to those skilled in the art upon review of the following detailed description, claims and drawings in which like numerals are used to designate like features.

Figure 1:
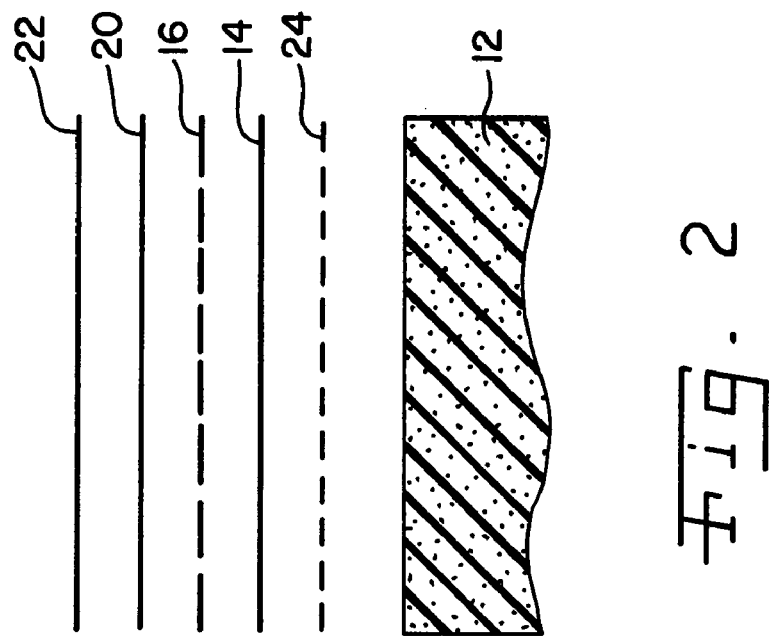
FIG. 1 is a cross-sectional schematic view illustrating the layers in a heating device according to the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 3:
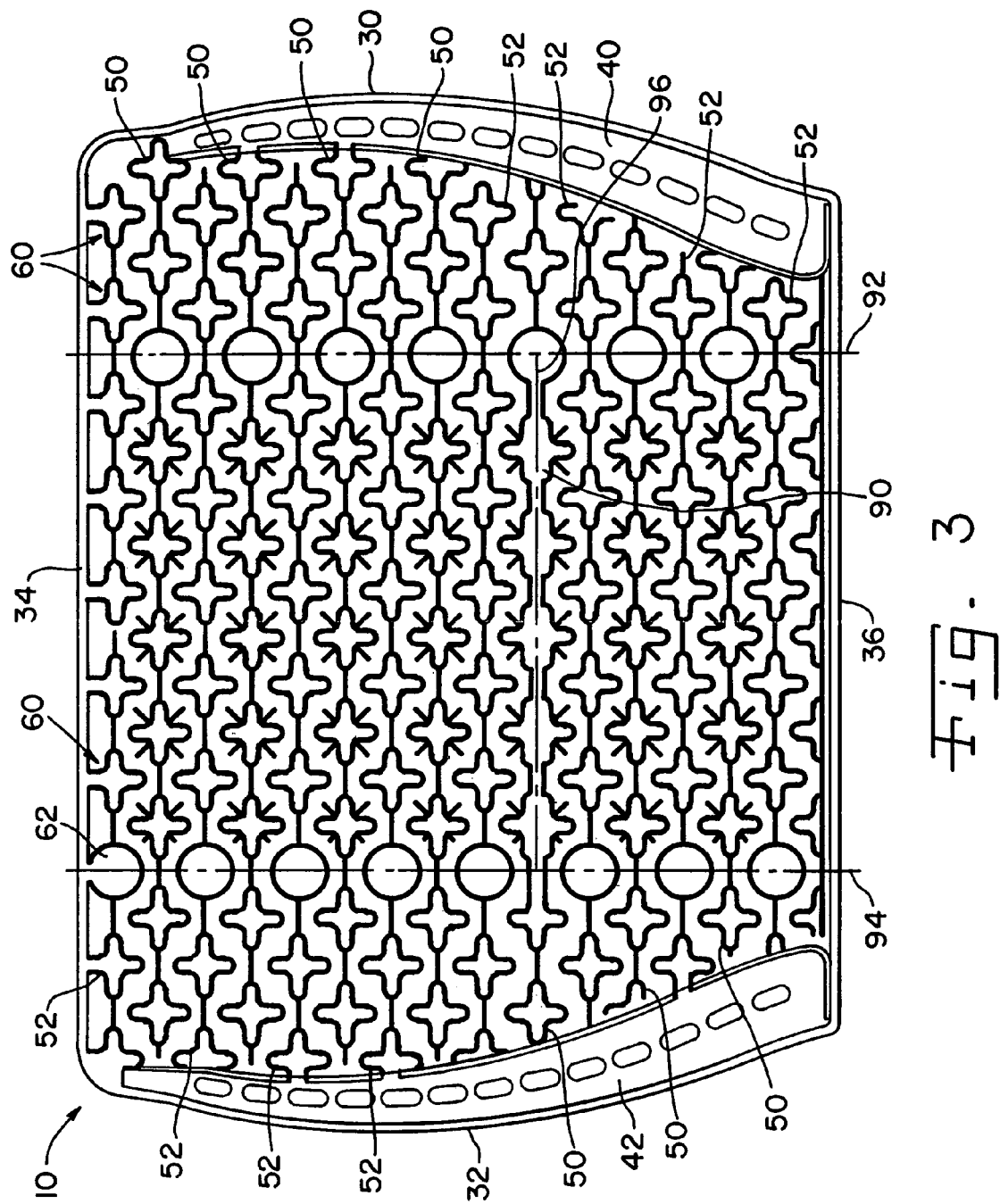
FIG. 3 is a schematic plan view of one embodiment of a heater in accordance with the present invention.
Figure 4:
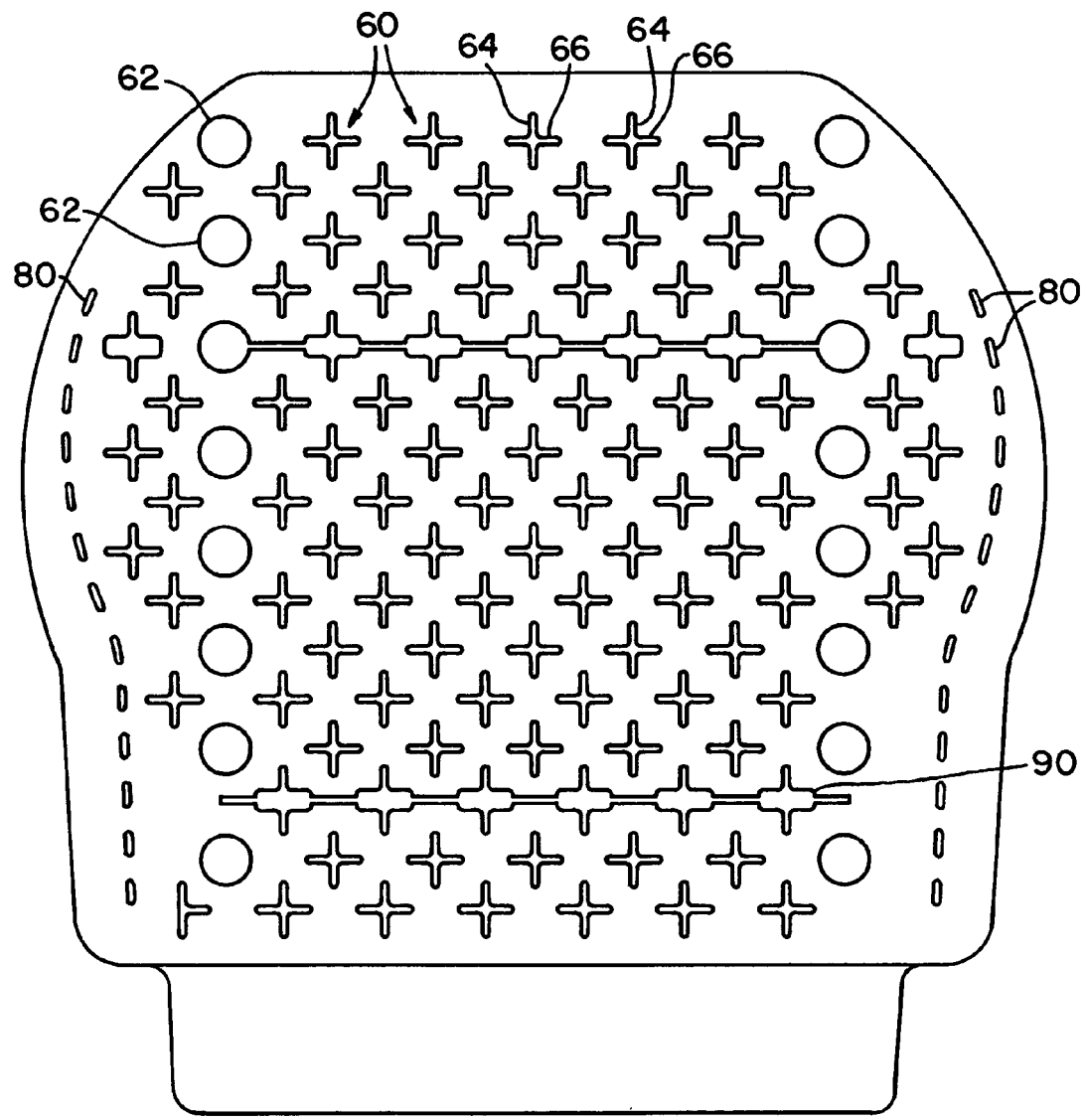
FIG. 4 is a schematic plan view of the resistive layer in the heater shown in FIG. 3, illustrating the holes therein.
Figure 5:
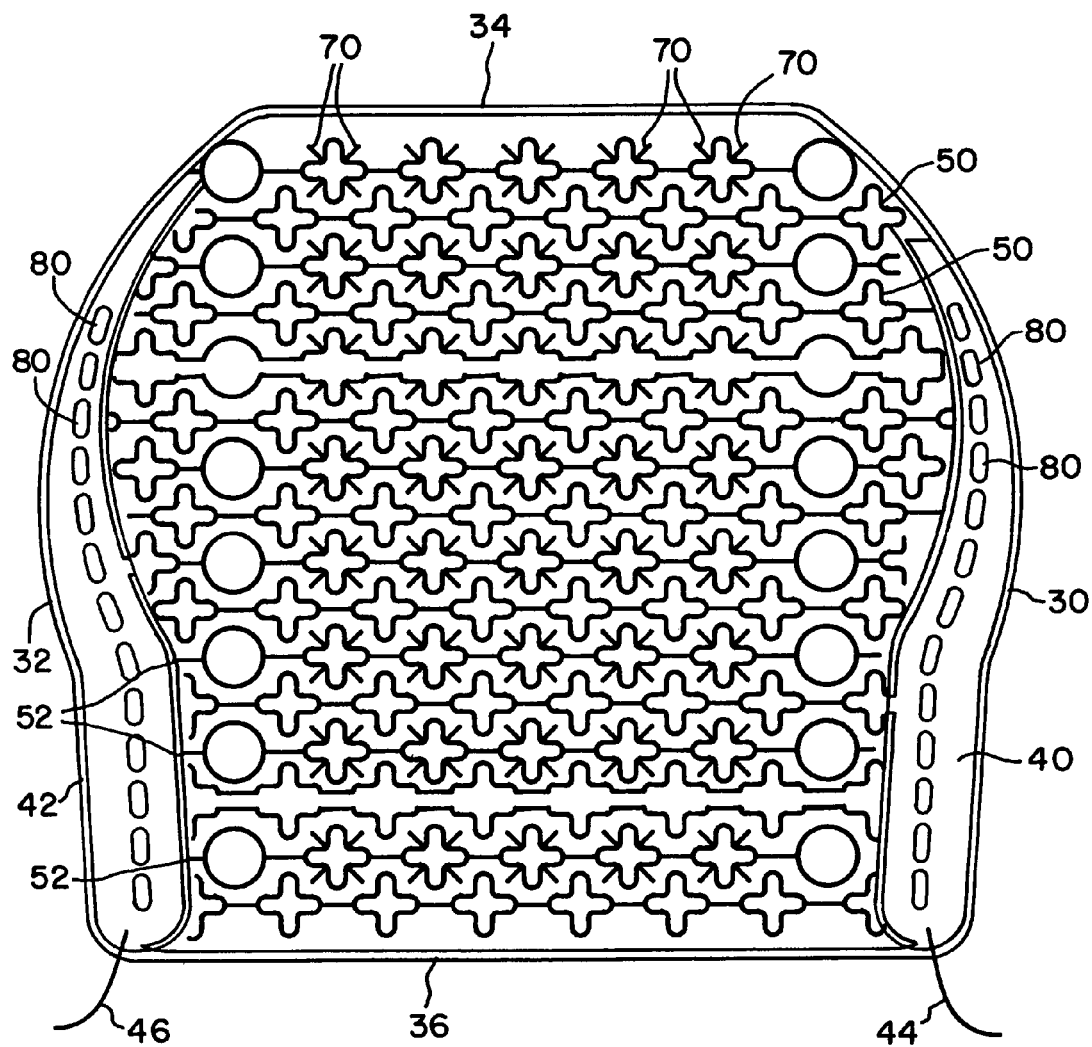
FIG. 5 is a schematic plan view of the heater shown in FIG. 3, but illustrating only the resistive layer with circuits printed thereon and without the holes through the layer shown in FIG. 4.

Referring now to the drawings in detail, FIGS. 3–5 show the typical outline of a heating device 10 of the present invention, particularly when used for a heater for an automotive seat or a similar application. Similar applications include, but are not limited to, off-road vehicles, marine applications, and the like.

Figure 2:
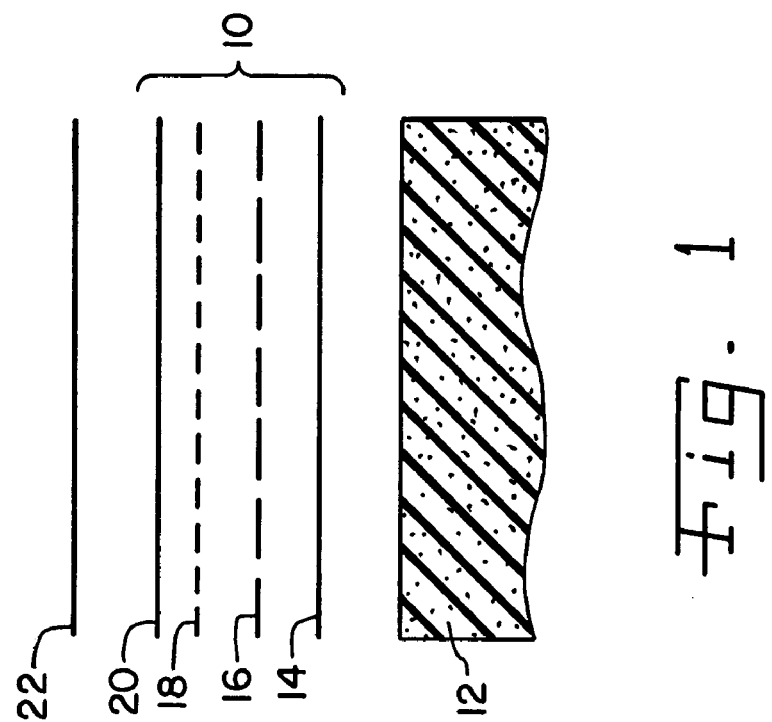
FIG. 2 is a cross-sectional schematic view illustrating an alternative sequence of layers in a heating device according to the present invention.

FIG. 1 shows the sequence of layers of a heating device 10 according to one embodiment of the invention. Heating device 10 is configured to be placed on a layer of foam rubber 12 or other cushioning or padding material of the seat. Heating device 10 of the embodiment illustrated in FIG. 1 includes a resistive or thermistor layer 14, a conductor layer 16 and an adhesive layer 18. Conductor layer 16, which includes various busses, conductive traces and the like such as shown in FIGS. 3–8, can be screen printed directly onto a substrate 20, in which case adhesive layer 18 is not required, as illustrated in FIG. 2. Substrate 20 is made of an electrically insulative material, such as a polyester film such as Mylar, but can be made of any suitable material according to the principles of the present invention. For example, substrate 20 can be made of various polymer films and other dielectric materials. Moreover, substrate 20 is configured sufficiently thin to allow heat to pass therethrough, but sufficiently thick to provide the mechanical properties consistent with the teachings of the present invention. If conductor layer 16 is not screen-printed onto substrate 20 (e.g., it can be printed onto thermistor layer 14), adhesive layer 18 is generally needed. Adhesive layer 18 is made from any number of suitable materials and applied in any suitable manner known in the art. Conductor layer 16 is typically made from a conductive metal such as copper, silver, gold, aluminum, carbon, or graphitic materials, and may also be an inherently conductive polymer such as polyaniline or polypryrrole. However, those skilled in the art will recognize a range of equivalent substitutions of material upon study of this disclosure. In general, the conductive material is made of very small flakes of material in a polymer matrix. If this material is caused to be over stretched or subjected to repeated stretching causing fatigue, the conductive layer may actually crack, thereby resulting in undesirable arching. Therefore, according to the present invention, substrate 20 is adapted to protect and prevent conductor layer 16 from being damaged in applications where a flexible heater is desired.

Resistive or thermistor layer 14 is applied on to conductor layer 16. Resistive layer 14 can be a PTC material to provide a self-regulating heater or can be a fixed resistance element which require an electronic controller (not shown) to regulate the heat level. Resistive layer 14 is typically a polymer thick film. The resulting heating device 10 may be placed between a layer of seating upholstery fabric 22 and the internal foam rubber 12 of the automotive seat. Heating device 10 may be laminated with foam to facilitate incorporation into a seat. Although not shown, an adhesive layer and a fabric layer may be positioned between resistive layer 14 and foam material 12. FIG. 2 does, however, illustrate an adhesive layer 24, by which adhesive layer 24 heating device 10 can be secured to foam rubber 12 or to the optional fabric layer (not shown). Adhesive layer 24 can be made of any suitable material, but a pressure sensitive adhesive is particularly suitable for use in accordance with the principles of the present invention. The adhesive and fabric can be applied in any suitable manner, such as by lamination. The fabric may be advantageously made of a flame retardant material. The fabric may also advantageously be a noise isolator, bulk stabilizer, and thermal insulator for the heater assembly. The density of the fabric may range from 1 to 10 ounces per square yard, but could be of other suitable densities. The flame retardant material may be based on halogen/antimony, melamine, phosphorus or inorganic flame retardant chemistry.

As a further option, according to one embodiment of the present invention, a dielectric film (not shown) can be applied over the conductor layer 16 by heat lamination. The film (not shown) improves the chemical resistance and durability of heating device 10. The heating device 10 thereby achieves improved resistance to chemicals such as plasticizers and solvents that can be found in automotive seats of some manufacturers. The laminate further protects the surface of the heating device 10 by preventing the silver and carbon black of the conductors from being removed by contact and abrasion with the fabric or other seat members. The adhesive laminate can further help to reduce or eliminate cracking of conductor layer 16, thereby extending the life of conductor layer 16 and that of heating device 10. For instance, polyester film with a polyester adhesive may be used. However, other types of films such as nylon, polyolefine and polyimide can be used, as well as other types of adhesives such as epoxy and acrylic adhesives, or even types of adhesive that are pressure sensitive rather than those requiring heat activation.

Referring now to FIGS. 3, 4 and 5, a first embodiment of the configuration of conductor layer 16 and resistive layer 14 is shown. Heating device 10 includes edges 30, 32, 34 and 36, and the exemplary embodiment shown includes four edges 30, 32, 34 and 36. Those skilled in the art will understand readily that heating device 10 can be configured in a variety of shapes and sizes, as required for the application to which it is applied. The embodiment of heating device 10 shown in FIGS. 3–5 is merely one suitable configuration for heating a seat.

Conductor layer 16 is formed to create a main buss 40 and a main buss ground 42. Main buss 40 extends along one edge 30 and is electrically connected to a lead wire 44. Main buss ground 42 extends along edge 32 opposite edge 30 and is electrically connected to a lead wire 46. Lead wires 44 and 46 electrically connect busses 40, 42 to an electrical system in known manner for supplying electric current to heating device 10. Busses 40, 42 extend from near one remaining edge 36 of heating device 10 to near the opposite remaining edge 34.

A plurality of traces 50, 52 extend from busses 40, 42, respectively, towards the other buss 42, 40, respectively. Traces 50, 52 alternate with one another and are alternately connected to busses 40, 42. Thus, in the direction from edge 34 towards edge 36, a first trace 52 is electrically connected to buss 42 and is adjacent a first trace 50 connected to buss 40. The first trace 50 is adjacent a second one of traces 52, which is also adjacent a second one of traces 50, and so on from edge 34 to edge 36. Each trace 50 is connected electrically to main buss 40, and each trace 52 is connected electrically to main buss ground 42.

Apertures 60, 62 are provided through all layers of heating device 10, and include some apertures 60 having elongated shapes and other apertures 62 being substantially circular. For purposes of clarity, only some apertures 60, 62 and not all apertures 60, 62 are designated with reference numerals in the drawings. Circular apertures 62 are provided for advantages in incorporating heating device 10 in a seat construction, as will be described more fully hereinafter. However, heating device can be provided with all elongated apertures 60 in accordance with the present invention. In the exemplary construction shown, elongated apertures 60 include two elongated slots 64, 66 intersecting each other at right angles, to thereby form an aperture 60 having a cross-like or T-shaped configuration. The cross-like or T-shaped configuration promotes flexibility of heating device 10 in all directions; however, other elongated slot configurations also can be used. For example, in some applications and uses of heating device 10, single slots can be used for elongated apertures 60. Single slot apertures 60 can be arranged in differing directions or in a single direction when only limited flexibility is required. Further, while slots 64, 66 are shown bisecting each other; the intersection of slots 64 and 66 can be other than at the midpoints of each. Yet further, the intersection of slots 64, 66 need not always be at right angles, and slots 64, 66 can form an X-like configuration. Still further, three or more slots can be arranged to intersect one another at various angles.

Elongated apertures 60 formed as crosses can be nested close together to provide flexibility for heating device 10. However, unlike the use of all circular apertures 62, cross-shaped apertures 60 provide additional surface area in the four quadrants surrounding the individual arms of the cross-like aperture. Thus, one or the other of traces 50, 52 or both traces 50, 52 can be provided with spurs 70 extending from one or the other of traces 50, 52 into nearby quadrants adjacent elongated slots 64, 66 of cross-like elongated aperture 60. For purposes of clarity, only some spurs 70 and not all spurs 70 are designated with a reference number in the drawings. One suitable configuration shown in the drawings has cross-like apertures 60 arranged in rows and ranks aligned along the axes of elongated slots 64, 66, with adjacent rows and ranks offset with respect to each other so that apertures 60 in adjacent rows and ranks overlap and are internested closely.

Elongated apertures 60 provide sufficient opening area in heating device 10 to provide the desired flexibility and ventilation of heating device 10. Further, the substantial open area reduces noise from crinkling or bending of heating device 10. Cross-like apertures 60 provide substantially the same degree of flexibility as would circular apertures of the same diameter as the length of slots 64, 66. However, because of the quadrants remaining adjacent slots 64,66, more surface area is available on conductor layer 16 than if circular apertures are used. Consequently, traces 50, 52 and spurs 70 can be provided in greater overall length by closely arranging traces 50, 52 and spurs 70 around and between elongated apertures 60. With traces 50, 52 and spurs 70 provided in greater concentration, heating is better equalized along the surface of heating device 10.

To promote flexibility in the areas of heating device 10 covered by busses 40, 42, elongated openings 80 are provided along the length thereof. For purposes of clarity, only some openings 80 and not all openings 80 are designated with reference numerals in the drawings. Openings 80 extend through all layers of heating device 10 in the preferred exemplary embodiment shown. As with apertures 60, openings 80 promote flexibility and ventilation.

It is common in seat constructions to provide stitching of the various layers one to another. It is undesirable any such that stitching interrupts the continuity of traces 50, 52 or spurs 70 more than necessary. Thus, FIG. 3 illustrates slightly enlarged interconnected elongated apertures 90 and closely spaced circular apertures 62 defining preferred locations of stitch lines 92, 94 and 96. Slightly enlarged elongated apertures 90 and circular apertures 62 provide reasonably sized target areas through which stitching can occur with only minimal damage to conductor layer 16 and traces 50, 52 and spurs 70 thereof.

Figure 8:
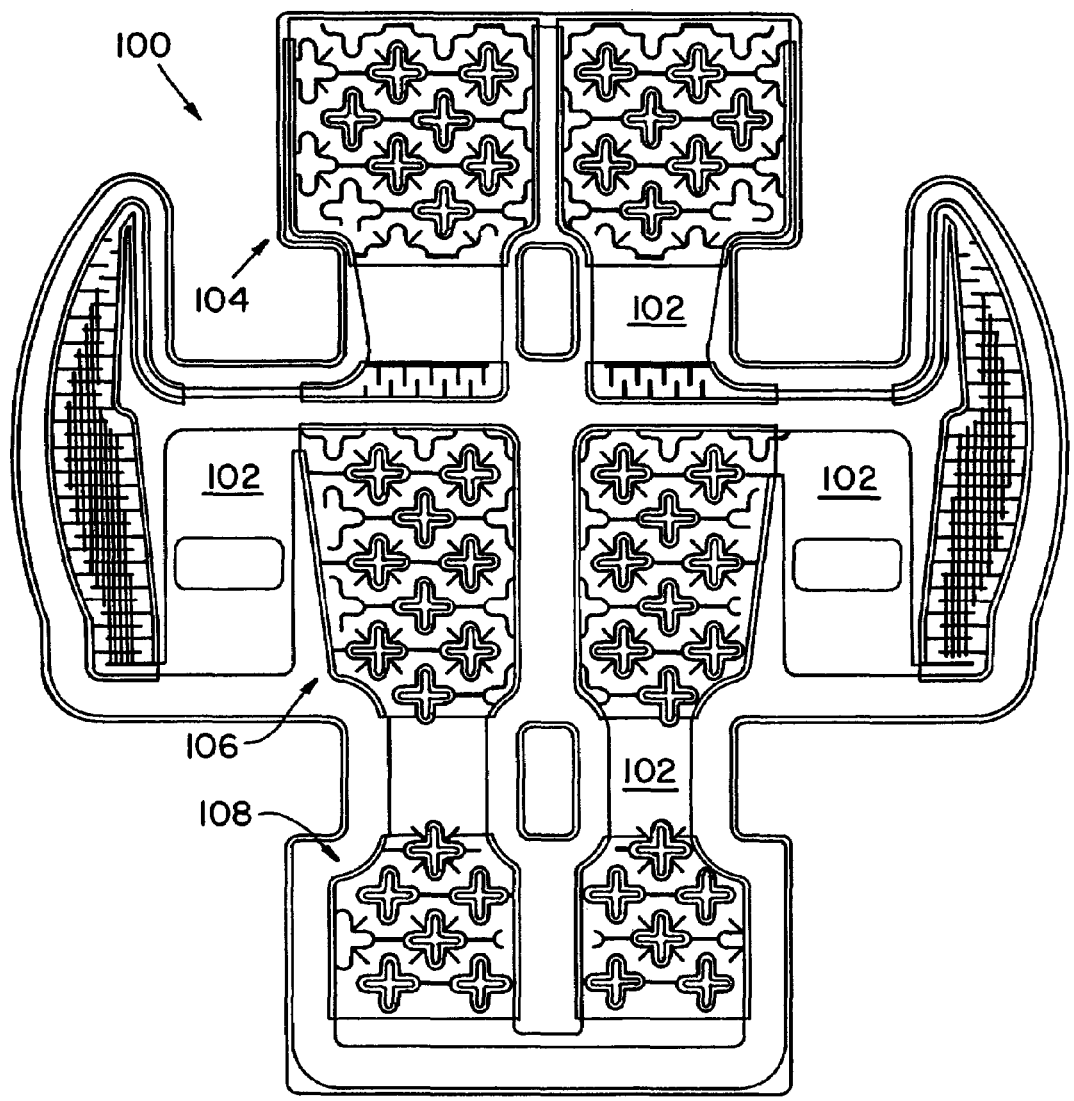
FIG. 8 is a schematic plan view of another embodiment of a heater in accordance with the present invention.

The present invention also works well with vehicle seats having tie-down channels commonly used in automotive seat construction. FIG. 8 illustrates a construction for a heating device 100 in which open areas 102 are provided adjacent relatively defined heating zones 104, 106 and 108. Heating device 100 can be folded at areas 102 into tie-down channels of the seat construction, for installation on the seat cushion without being sewn in. Through selection of the size, number and shapes of individual heating zones, full bolster heating can be provided for seats of various sizes, shapes and styles.

Providing discrete cutouts as elongated apertures 60 in a cross-shaped pattern is preferred over simple slits formed through heating device 10. Cross-like apertures 60 can be formed with rounded ends, as shown, to provide stress relief and reduce potential tearing from bending and flexing during use.

Figure 6:
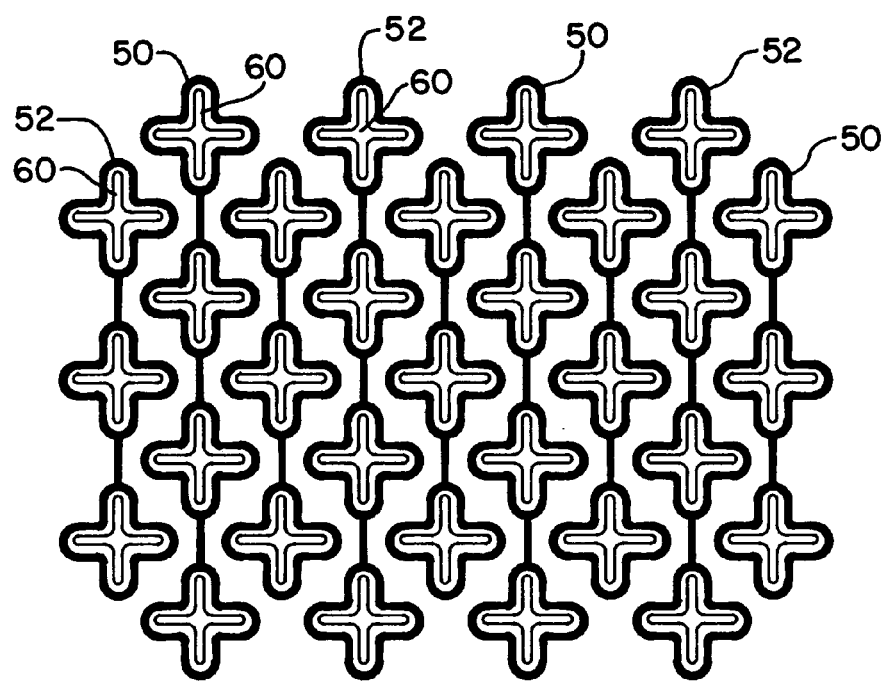
FIG. 6 is a schematic view illustrating another embodiment of the printed circuit for a heater of the present invention.
Figure 7:
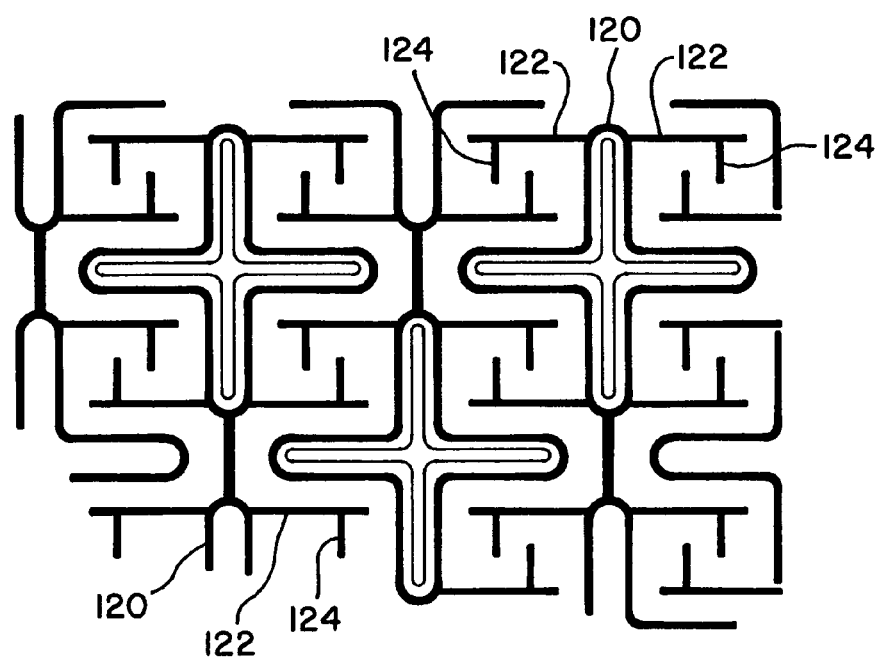
FIG. 7 is a schematic view of yet another embodiment of the printed circuit for a heater of the present invention.

It should be further recognized that a variety of patterns can be used for traces 50, 52 and spurs 70 around and near apertures 60, 62. It is generally of advantage to arrange traces 60, 62 close to the edges of apertures 60, 62. Narrow and elongated apertures 60 create minimal space between adjacent traces 50, 52, thereby providing more even heat distribution than when circular apertures 62 of the same general size are used exclusively. FIG. 6 illustrates trace patterns surrounding apertures 60 without spurs 70. FIG. 7 illustrates traces 120 having spurs 122 with branches 124 extending therefrom. For purposes of clarity, only some spurs 122 and some branches 124 and not all spurs 122 and branches 124 are designated with reference numbers in the drawings. Those skilled in the art will readily recognize that other configurations for traces, spurs and/or branches can be used advantageously in the present invention.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A heating device for producing heat when connected to an electrical power source, comprising:
    an electrically insulative substrate positioned beneath a flexible member;
    a plurality of apertures through said substrate and said member, at least some of said apertures being narrow elongated apertures;
    a conductive layer on said substrate in a pattern thereby forming a buss structure including first and second busses along opposite sides of said substrate, and alternating traces electrically connected to opposite said busses and extending between said busses, said traces surrounding said apertures, wherein said substrate is adapted to limit elongation of said conductive layer when said substrate is subjected to a flexing action, so as to improve durability of the conductive layer; and
    a resistive layer applied to said conductive layer such that when an electrical power source is connected to said buss structure of the heating device, heat is generated.

2. The heating device of claim 1, wherein said apertures include intersecting elongated slots.

3. The heating device of claim 2, wherein said intersecting slots are substantially normal to each other, thereby forming cross-shaped apertures.

4. The heating device of claim 2, wherein said intersecting slots are mutually bisecting.

5. The heating device of claim 2, wherein said apertures are aligned in rows and ranks along axes of said slots.

6. The heating device of claim 5, wherein adjacent rows and ranks are offset with respect to each other and apertures in adjacent rows and ranks overlap.

7. The heating device of claim 5, further comprising spurs from at least some of said traces extending toward the next adjacent said trace.

8. The heating device of claim 1, including spurs from at least some of said traces extending toward the next adjacent said trace.

9. The heating device of claim 1, including elongated openings through said substrate and said member said apertures including rows of cross-like apertures closely inter-nested.

10. The heating device of claim 1, said apertures including enlarged apertures defining stitch zones for stitching said heating device to a structure.

11. A heating device for producing heat when connected to an electrical power source, comprising:
    an electrically insulated substrate having a plurality of cross-like apertures extending therethrough;
    a conductive layer on said substrate and including busses extending along opposite edges of said substrate and traces extending from said busses and surrounding said apertures; and
    a resistive layer against said conductive layer such that when an electrical power source is connected to said buss structure of the heating device, heat is generated.

12. The heating device of claim 11, at least some of said traces including spurs extending toward adjacent said traces.

13. The heating device of claim 12, at least some of said spurs including branches therefrom.

14. The heating device of claim 12, said spurs extending into quadrants between elongated slots forming said cross-like apertures.

15. The heating device of claim 14, at least some of said spurs including branches therefrom.

16. The heating device of claim 11, wherein the heating device is configured as a seat heater for an automobile.

17. A heating device for producing heat when connected to an electrical power source, comprising:
    a substrate;
    a layer of resistive material;
    a plurality of cross-like apertures formed through said substrate and said resistive material;
    a layer of conductive material forming a first buss along one edge of said substrate and said resistive material, a second buss formed along an opposite edge of said substrate and said resistive material, a plurality of first traces extending from said first buss toward said second buss and a plurality of second traces extending from said second buss toward said first bus, said first and second traces surrounding at least some of said apertures and arranged alternatingly with each other.

18. The heating device of claim 17, at least some of said traces including spurs extending therefrom.

19. The heating device of claim 18, said spurs extending into quadrants of said resistive layer defined adjacent said cross-like apertures.

20. The heating device of claim 19, at least some of said spurs including branches therefrom.

* * * * *